United States Patent Office 3,429,649
Patented Feb. 25, 1969

3,429,649
PREPARATION OF CONDENSATION PRODUCTS
Franz Schade, Cologne-Buchheim, and Ernst Komarek and Viktor Trescher, Leverkusen, Germany, assignors to Farbenfabriken Bayer Aktiengesellschaft, Leverkusen, Germany, a corporation of Germany
No Drawing. Filed Feb. 3, 1967, Ser. No. 613,756
U.S. Cl. 8—94.24          4 Claims
Int. Cl. C14c 3/18

ABSTRACT OF THE DISCLOSURE

A process for condensing in an acid medium diphenyloxide sulfonic acid with formaldehyde and an aromatic hydroxycarboxylic acid, e.g. salicylic acid. A process for tanning skins or hides using the product of this condensation as the tanning agent.

---

This invention relates to the preparation of condensation products from aromatic acids and formaldehyde, the products being useful as tanning agents.

Condensation products of unsulfonated diaryl ethers, salicylic acid and formaldehyde are described in German patent specification No. 728,980. Products of this nature can only be used to a very limited extent for the tanning of hides because of their sparing solubility in the acid pH range; in the optimum range of about pH 3.5 for the binding of phenolic tanning agents they can only be used under special and additional working conditions, e.g. with preceding or subsequent acidification. The said patent specification also mentions the possibility of subsequently sulphonating the condensation products of, for example, diaryl ethers, salicylic acid and formaldehyde. Nothing is stated about the properties of the products obtainable in such a manner.

It has now been found that valuable new condensation products are obtained when 1 mole diphenyloxidesulphonic acid is condensed in acid medium with approximately 0.5–4 moles of an aromatic hydroxycarboxylic acid, preferably salicylic acid, and approximately 1–4 moles formaldehyde or formaldehyde-yielding agents. According to a preferred embodiment, 1.5 to 2.2 moles formaldehyde or formaldehyde-yielding agents are used.

The products of this invention have improved solubility properties which, in turn, give these products greater opportunities for use as tanning agents. The salts of these condensation products are water-soluble over a wide range of pH values, and this permits the use of more convenient and desirable conditions in the tanning process. In addition, the process for preparing these products is simple and does not require any unusual reaction conditions or equipment.

The condensation according to the invention proceeds in the acid range below pH 2.0 and at elevated temperature, for example in the range of 80 to 115° C. and preferably in the range of 100 to 105° C. Expediently, the diphenylethersulphonic acids which are formed during the sulphonation of the diphenyl ether, and small amounts of sulphuric acid which have not been reacted during the sulphonation, are utilised for acidification of the condensation mixture.

As diphenyloxidesulphonic acids, there are eligible, above all, mono- or disulphonic acids or mixtures of such sulphonic acids. For the sulphonation of diphenyl oxide, which takes place for example by the action of sulphuric acid monohydrate or chlorosulphonic acid at elevated temperature, either pure diphenyl oxide or preferably technical mixtures can be used such as are obtained when phenol is prepared from chlorobenzene and which contain, besides diphenyl oxide, various other phenols such as o- and p-hydroxydiphenyl as impurities. Such impurities do not impair the properties of the condensation products obtainable according to the invention, e.g. in their tanning action.

As aromatic hydroxycarboxylic acids, salicylic acid is preferably used. However, other aromatic hydroxycarboxylic acids such as o-cresotic acid and 3-chloro-2-hydroxybenzoic acid may also be used.

As formaldehyde-yielding agents, the compounds known in the art can be used, for example aqueous formaldehyde solutions, paraformaldehyde or hexamethylenetetramine.

The condensation of the starting products is generally carried out until there is complete reaction or complete disappearance of formaldehyde. In the course of the reaction, the condensation product which is formed is precipitated in resinous form. For the working up of the reaction mixture, neutralisation can be effected with ammonia solution and the solution obtained adjusted with organic acids, for example, acetic acid, to an acid number suitable for the purposes intended, e.g. for self-tanning agents or exchange tanning agents. The condensation products can, however, also be worked up by spray drying the reaction mass, the product being obtained in powder form. This also can be adjusted to a desired acid number with suitable powdered organic acids.

The new condensation products obtainable according to the process are valuable tanning and retanning agents and can for example be used outstandingly well for the tanning of hides and leather.

A particular use of the condensation products obtainable according to the process lies in the production of shrunk leather.

According to processes known for example from German published specifications Nos. 1,150,488 and 1,158,-660, shrunk leather is obtained by taning animal pelts with synthetic tanning agents which contain methylol groups and which have been acidified with mineral acid, followed by tanning with chrome tanning agents. In view of the practical requirements in particular for labour-saving tanning processes in chrome leather factories, processes are aimed at according to which shrunk leather is not produced in a special making but the entire pelt material can be subjected to a uniform beamhouse work and chrome tanning, after which parts of the material can be further processed into shrunk leather after sorting of the different types of leather. The use of the new condensation products obtainable according to the process renders it possible to process chrome leather, possibly also subranges, into shrunk leather after shaving. The chrome leather is treated in a concentrated liquor or, according to the shrinkage grain desired, in a more dilute liquor, with the new condensation products obtainable according to the process, or, after a preliminary run in weak acid, preferably acetic acid or glutaric acid, it is treated in the tanning drum with neutral condensation products of the nature obtainable according to the process. With good drumming action, a shrinkage effect which is uniform into the flanks can be obtained in this way. Chrome leather treated according to the process is further distinguished by particularly good fullness, namely in the looser parts of the hides. Particularly suitable for the production of shrunk leather after chrome tanning are calf skins, goat skins and the skins of other small animals, in particular chrome pre-tanned imported goods, so-called "wet-blue" leather. A well-marked, uniform shrinkage effect can also be achieved on chrome-tanned cow-hide necks and cow hides and kid leather from two-bath chrome tanning. An advantage of the new condensation products obtainable according to the process which is to be particularly emphasised lies in the fact that in the form of their salts they are readily water-soluble not only in the alkaline and neutral range but also in the weakly acid range. As a result of this, adjustments with a pH of 3.0 to 3.5 can be used outstandingly well for tanning without the danger of undesirable precipitations.

The parts stated in the following examples are parts by weight.

Example 1

170 parts diphenyl oxide are mixed with 128 g. sulphuric acid monohydrate by stirring and heated to 130° C. for 1 hour, a mixture of mono- and disulphonic acids of diphenyl ether with small amounts of unreacted sulphuric acid being obtained. After cooling of the reaction mass to 80–90° C., 100 parts water and 276 parts salicylic acid are added. Then 210 parts 30% aqueous formaldehyde are allowed to run in with constant stirring. When the reaction mixture is heated to 85–90° C. a clear solution is formed. Condensation is then effected for 8–10 hours at 100–105° C., with constant stirring, until formaldehyde can no longer be detected. After about 2 hours a resinous paste begins to precipitate. After condensation is completed, the reaction mixture is neutralised to pH 3.5–4.5 with ammonia solution. The condensate obtained can now be isolated as such, for example by spray drying, or first adjusted, for example with acetic acid, to an acid number suitable for use for self-tanning or exchange tanning and then used for tanning in this form or in isolated form. The spray-dried product can be adjusted to the desired acid number with suitable organic acids before or after spray drying.

Example 2

170 parts diphenyl oxide are sulphonated with 175 parts sulphuric acid monohydrate as described in Example 1 and then mixed with 100 parts water and 138 parts salicylic acid, with stirring; 105 parts 30% formaldehyde are then added at 100–105° C. in 3 portions. After condensation for 8–10 hours the formaldehyde is completely consumed. After neutralisation to pH 3.5–4.2 with ammonia solution or sodium hydroxide or potassium hydroxide solution, spray drying is effected. Acidification for self-tanning or re-tanning can take place with solid organic acids after spray drying.

Example 3

170 parts of a crude diphenyl ether from which phenols have largely been eliminated by alkaline washing are sulphonated with 147 g. sulphuric acid monohydrate for 1 hour at 130° C., with stirring. The diphenylethermono- and disulphonic acid mixture obtained is cooled to 80–90° C. and, with stirring, mixed with 100 parts water and 276 parts salicylic acid. Then, with intensive stirring, 210 parts aqueous 30% formaldehyde solution are allowed to run in. When the reaction mixture is heated to 85–90° C. a clear, red-brown solution is formed. After temporarily strongly exothermic reaction, condensation is effected for 6–8 hours at 100–105° C., with stirring, until formaldehyde can no longer be deteced. After about 2 hours a resinous paste begins to precipitate. After condensation is completed, the reaction mixture is neutralised to pH 3.5–4.2 with ammonia solution, spray-dried and, according to the purpose for which is it to be used, adjusted with suitable organic acids, for example glutaric acid or adipic acid.

Percentages stated in the following examples, except in the case of concentrations, relate to leather weight after shaving or sammying.

Example 4

Calf skins which have been chrome tanned in the usual manner are, after shaving, washed briefly without neutralisation, sammied, and milled in a rapidly running (15–25 revolutions/minute) tanning drum for 1 hour without liquor. A solution of 15% of the neutral condensation product described in Example 1 in 50% water is then, after having been adjusted with acetic acid to an acid number 310, added through the hollow axle and drumming is continued for a further 3 hours. The leathers are then neutralised in the customary manner, dyed and dubbed. The shrinkage effect achieved can be developed still more strongly by mechanical processing. The leathers can be finished by aniline coating as well as by covered coating.

The leathers thus obtained are distinguished by uniform shrinkage with good fullness.

Example 5

Chrome pre-tanned wet blues are washed, sammied and milled for 1 hour in a tanning drum. A solution of 5% of 98% acetic and 25% water is added and drumming is effected for 30 minutes for uniform distribution in the leather. For shrinkage, a solution of 15% of a neutral condensation product prepared according to Example 1 in 25% water is added through the hollow shaft and drumming is continued for a further 3 hours. Neutralisation is then effected and further processing carried out as stated in Example 4. Uniformly finely shrunk leathers with good fullness are obtained.

Example 6

Shaved cow-hides of 1.8 mm. thickness which have been chrome tanned in the customary manner are, without neutralisation, milled for 30 minutes without liquor in a rapidly running tanning drum (15–25 revolutions/minute). 25% water and 8.5% of 60% acetic acid are added and drumming is effected for 30 minutes. 15% of a condensation product described in Example 3 are then added to the tanning powder form without addition of acid and, after the drum has started running, 25% water of 35° C. are added through the hollow axle. After 2 hours drumming, there results a shrinkage which is very uniform over the whole surface. The shrunk leather obtained in this manner is washed, neutralised, dyed, dubbed and dried either hanging up or in a warm air drum. To accentuate the shrinkage, the leather can be grained after staking. Finishing of the leather can take place in aniline coating as well as in covered coating.

We claim:
1. In the process for producing leather, the improvement which comprises applying to tanned or untanned skins or hides as a tanning agent, exchange tanning agent or retanning agent a condensation product produced by the condensation in an acid medium of 1 mol of diphenyloxidesulfonic acid with about 5 to 4 mols of an aromatic hydroxycarboxylic acid and about 1 to 4 mols of formaldehyde or a formaldehyde yielding agent.

2. In the process of claim 1, applying the condensation product in a shrinkage tannage.

3. The process of claim 1, in which the hydroxycarboxylic acid is salicylic acid.

4. The process of claim 2, in which the hydroxycarboxyle acid is salicylic acid.

References Cited

FOREIGN PATENTS 728,980  12/1942  Germany.

NORMAN G. TORCHIN, *Primary Examiner.*

D. LEVY, *Assistant Examiner.*

U.S. Cl. X.R.

8—94.26